Oct. 22, 1968     W. H. HOENISCH     3,406,871
FLAKED ICE DISPENSER
Filed June 24, 1965     6 Sheets-Sheet 1
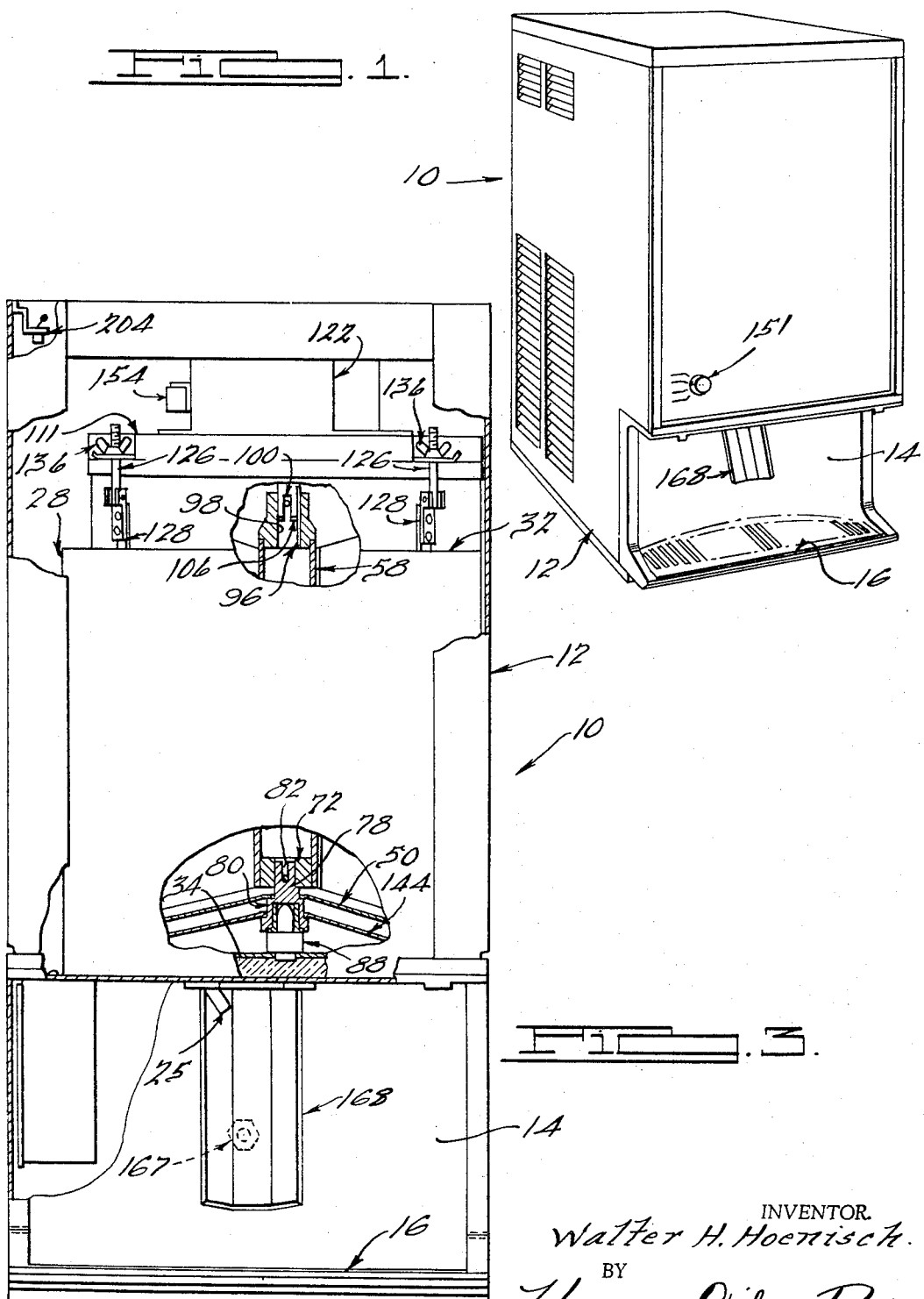
INVENTOR.
Walter H. Hoenisch.
BY
Harness, Dickey & Pierce.
ATTORNEYS

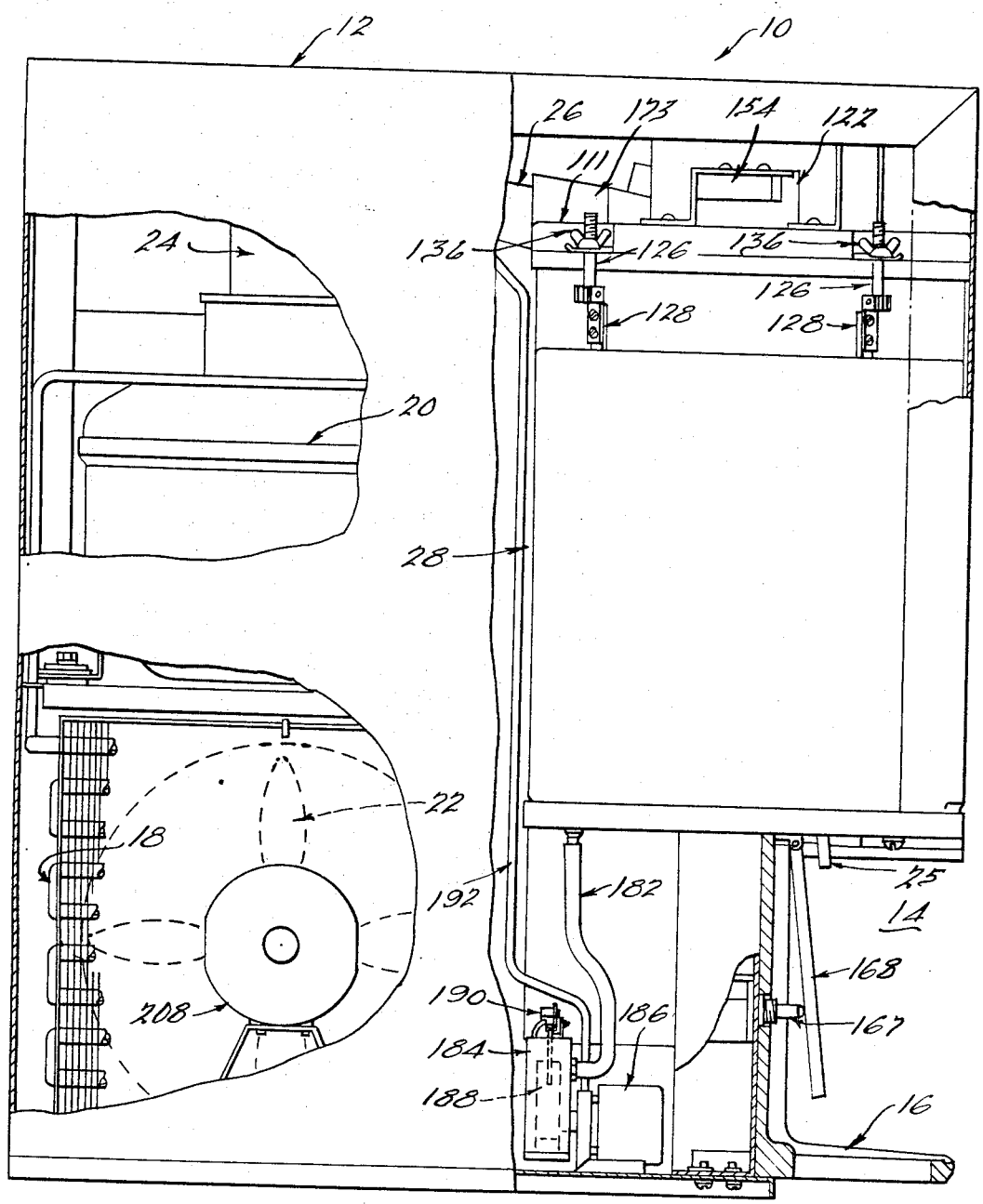

INVENTOR.
Walter H. Hoenisch
BY Harness, Dickey & Pierce
ATTORNEYS.

Oct. 22, 1968  W. H. HOENISCH  3,406,871
FLAKED ICE DISPENSER
Filed June 24, 1965  6 Sheets-Sheet 4
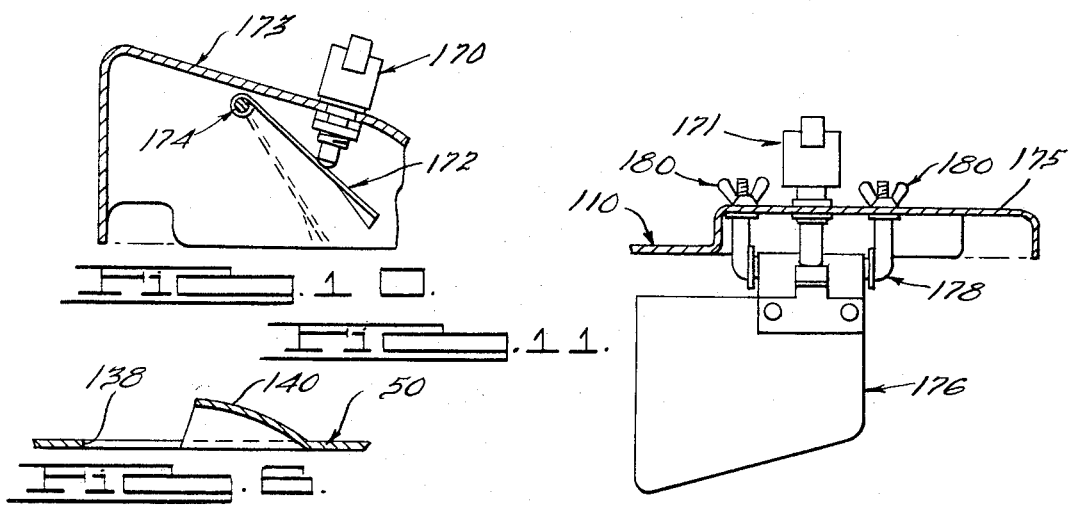
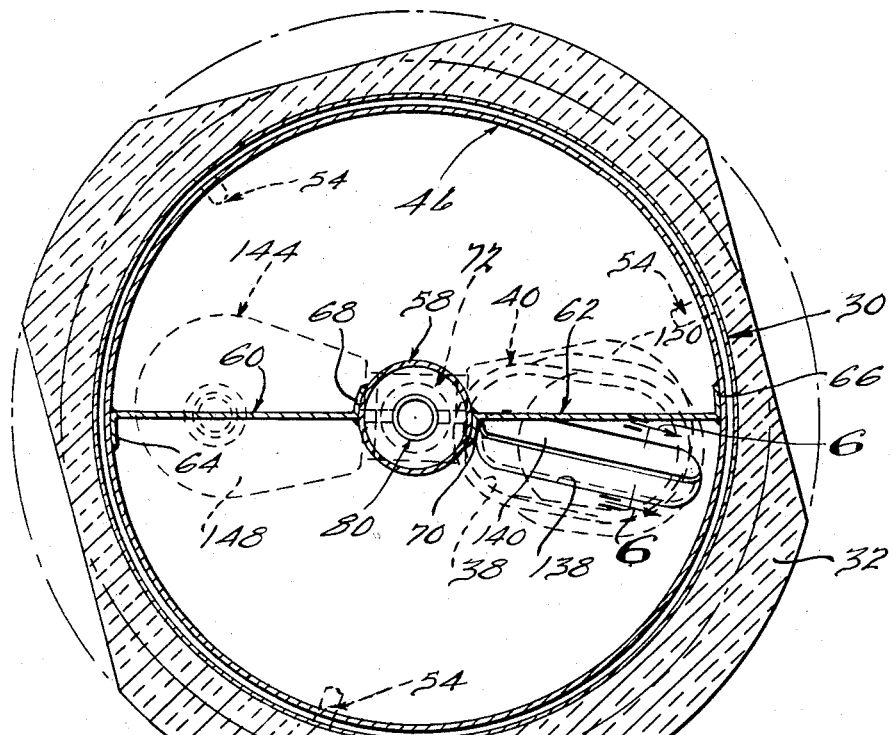
INVENTOR.
Walter H. Hoenisch
BY
Carness, Dickey & Pierce
ATTORNEYS Oct. 22, 1968  W. H. HOENISCH  3,406,871
FLAKED ICE DISPENSER
Filed June 24, 1965  6 Sheets-Sheet 5
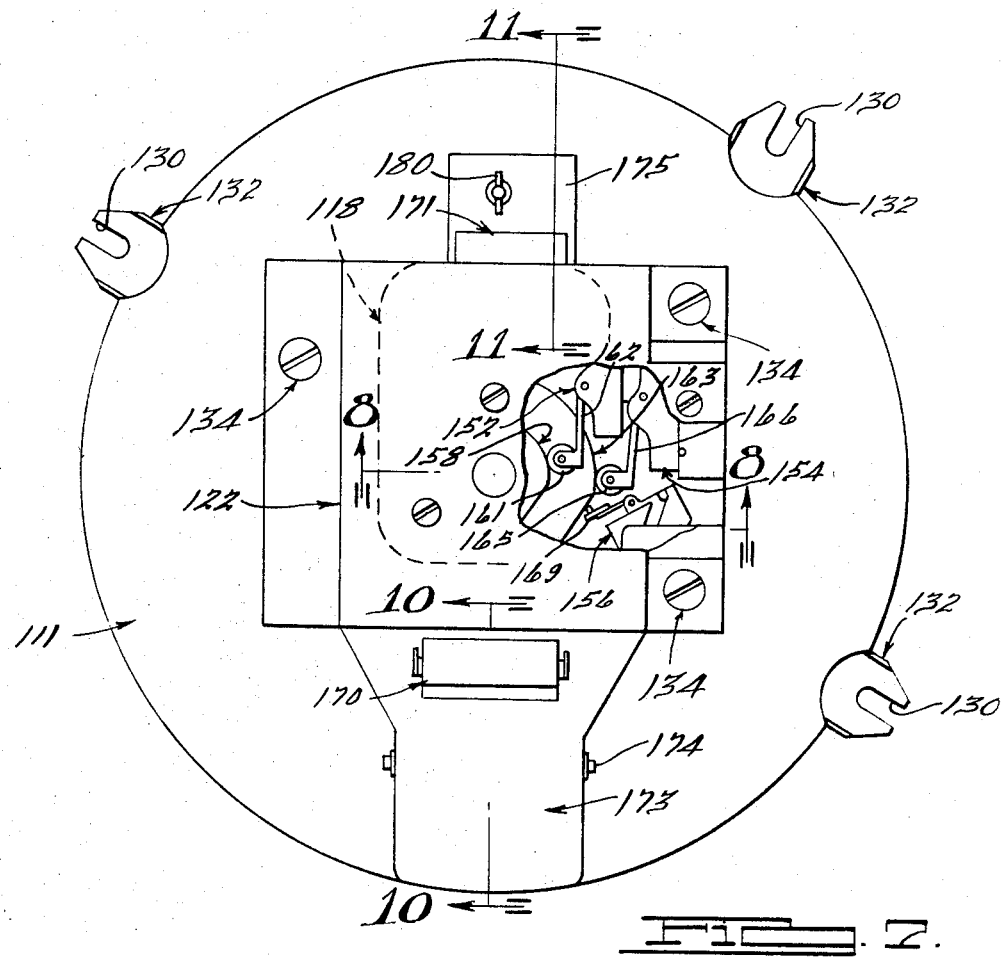
INVENTOR.
Walter H. Hoenisch
BY
Jameson, Dickey & Pierce
ATTORNEYS

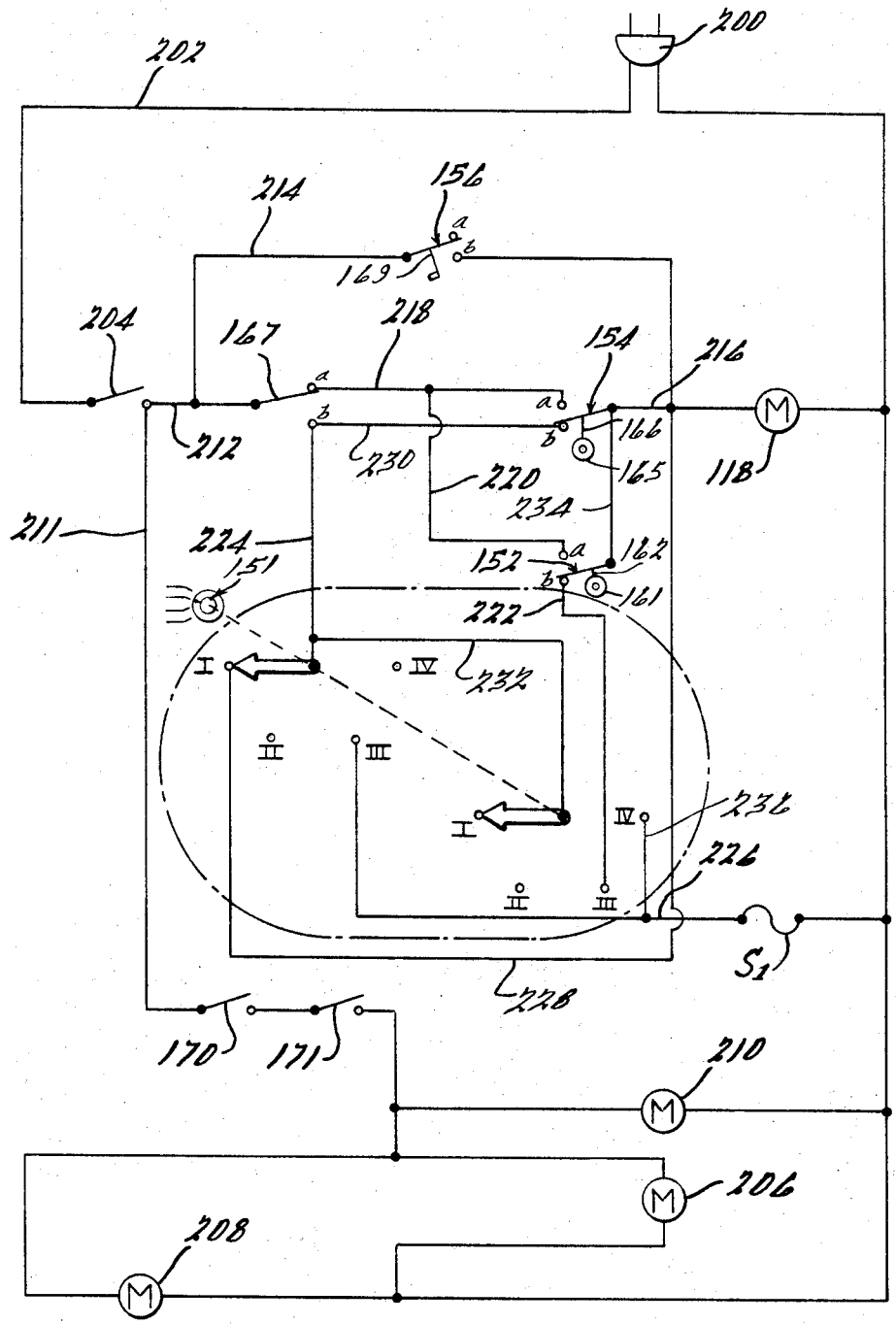

United States Patent Office 3,406,871
Patented Oct. 22, 1968

3,406,871
FLAKED ICE DISPENSER
Walter H. Hoenisch, Albert Lea, Minn., assignor to King-Seeley Thermos Co., Ann Arbor, Mich., a corporation of Michigan
Filed June 24, 1965, Ser. No. 472,753
32 Claims. (Cl. 222—56)

This invention relates generally to improvements in apparatus for storing and dispensing ice, and more particularly, to an extremely simple and compact apparatus for storing and dispensing ice in flaked or particulate form.

By virtue of the fact that ice in a particulate form, such as shaved, pulverized, crushed or flaked ice, has the desirable characteristics of affording both rapid cooling and extreme portability, there has been, over the last several years, an increasing demand for suitable equipment adapted to conveniently dispense and store ice in this particulate form. Heretofore, it has been the practice to manually scoop the ice from an open storage bin or reservoir; however, this technique has been highly objectionable and unsatisfactory due to the inconvenience and inaccuracy in obtaining controlled quantities of the ice, and also because such methods promote considerable spillage and contamination of the ice thus obtained.

It is accordingly a primary object of the present invention to provide a new and improved ice dispensing apparatus which overcomes the above objections attendant the heretofore known and used methods of manually dispensing ice in particulate form.

It is another object of the present invention to provide an improved particulate ice dispensing apparatus of an extremely simple and compact design that will serve to rapidly deliver particulate ice in predetermined measured quantities.

It is a more particular object of the present invention to provide a particulate ice dispensing apparatus which may be mounted upon a countertop, table, bar or the like, or which may be incorporated in a vending machine of the type requiring metered quantities of particulate ice for soft drinks and the like.

It is still another object of the present invention to provide an improved particulate ice dispenser of the above character that will greatly facilitate the handling of particulate ice in a sanitary manner.

It is a more specific object of the present invention to provide a particulate ice dispensing apparatus of the above character wherein the ice is stored and delivered without contact with human hands or other possible sources of contamination.

It is yet another object of the present invention to provide a particulate ice dispensing apparatus wherein there is little possibility of malfunctioning due to adhesion or "bridging" between the ice particles.

It is yet a further object of the present invention to provide a particulate ice dispensing apparatus having an ice storage compartment that will become automatically replenished when the volume of particulate ice therein reaches a preselected level.

It is still a further object of the present invention to provide a particulate ice dispensing apparatus which may be easily installed and readily assembled and disassembled for cleaning and the like without the use of any special tools.

It is still another object of the present invention to provide an improved ice dispensing apparatus which is adapted to simultaneously dispense water during an ice vend cycle.

Other objects and advantages of the present invention will become apparent from the following detailed description taken in conjunction with the accompanying drawings wherein:

FIGURE 1 is an elevated perspective view of the exterior housing containing the ice dispensing apparatus of the present invention;

FIGURE 2 is an enlarged side elevational view, partially broken away, of the structure illustrated in FIGURE 1;

FIGURE 3 is an enlarged front elevational view, partially broken away, of the ice storage and dispensing portion of the apparatus illustrated in FIGURE 2;

FIGURE 5 is a transverse cross-sectional view, taken along the line 5—5 of FIGURE 4;

FIGURE 6 is a fragmentary cross-sectional view taken along the line 6—6 of FIGURE 5;

FIGURE 7 is an enlarged top elevational view of the top of the dispensing apparatus illustrated in FIGURE 4, as seen when removed from the ice storage bin thereof;

FIGURE 8 is a fragmentary cross-sectional view taken along the line 8—8 of FIGURE 7;

FIGURE 9 is a cross-sectional view of the structure illustrated in FIGURE 8, taken along the line 9—9 thereof;

FIGURE 10 is a fragmentary cross-sectional view taken along the line 10—10 of FIGURE 7;

FIGURE 11 is a fragmentary cross-sectional view taken along the line 11—11 of FIGURE 7; and FIGURE 12 is a schematic diagram of the wire system of the present invention.

Figure 4:
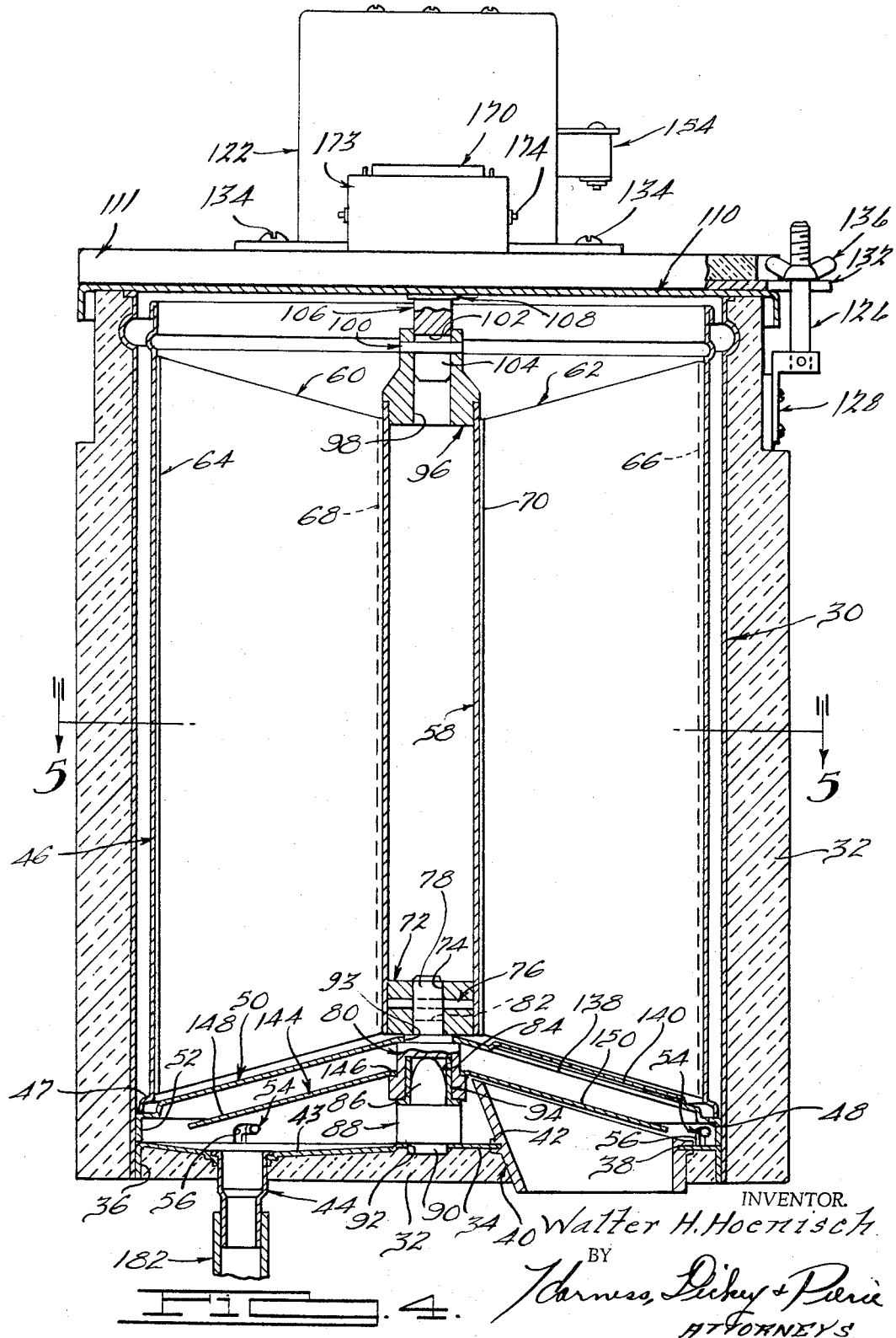
FIGURE 4 is an enlarged longitudinal cross-sectional view of the ice storage and dispensing portion of the apparatus illustrated in FIGURE 3.

Broadly speaking, the particulate ice dispensing apparatus of the present invention comprises an ice storage bin that is rotatably mounted within a dispensing housing and within which a mass or volume of particulate ice is stored prior to being dispensed therefrom. At such time as it is desired to dispense particulate ice from the storage bin, the entire mass of stored ice is moved, as by rotating the bin, over a stationary discharge spout supported in a plate adjacent the lower end of the ice mass, this plate being provided with means for shearing ice from the end of the moving mass in the event there exists any adhesion or "bridging" between the ice particles. A shutter assembly is provided to selectively close the discharge spout and thereby shed meltage water and block the flow of ice through the discharge spout at the end of each vend or dispensing cycle, this assembly being controlled simultaneously with the actuation of the ice moving mechanism by a rotating cam and cam follower mechanism which functions to deenergize a drive motor at the end of each cycle. There is also provided switch means that is responsive to the level or quantity of particulate ice stored within the storage bin to automatically energize an associated ice producing mechanism, whereby the bin will automatically be replenished with a fresh supply of particulate ice after a predetermined number of vends.

Referring now to the drawings, a flaked or particulate ice dispensing apparatus 10, in accordance with a preferred embodiment of the present invention, comprises an exterior cabinet or housing 12 which is formed with a dispensing cavity 14 and a drainboard 16 in the lower end of the front or forward side thereof. The housing 12 contains within its back or rearward portion, a refrigeration system of a type well known in the art and including a condenser 18, a compressor 20 and cooling fan 22. This refrigeration system serves to supply refrigerant to a particulate ice producing mechanism, generally designated 24, of conventional design and located in the upper end of the cabinet 12 adjacent the refrigerator compressor 20, as best seen in FIGURE 2. The refrigerant system may also be used to cool a liquid such as drinking water or the like to be dispensed through a suitable conduit or fitting 25 located in the discharge cavity 14 of the cabinet 12, as will later be described. An ice inlet chute or spout 26 is provided in the upper end of the cabinet 12 and is adapted to communicate particulate ice produced by the mechanism 24 to an ice vending assembly generally designated 28, that is mounted in the front or forward portion of the cabinet 12 and functions to selectively dispense predetermined quantities of ice in particulate form to a suitable receptacle disposed within the dispensing cavity 14, in a manner hereinafter to be described.

It may be noted that while the particular arrangement of the aforementioned refrigeration and ice producing components is not essential to advantageous use of the various features of the present invention, their combination with the storage and dispensing portions of the hereinafter to be described ice vending assembly 28, provides a completely self-contained unit that will serve to conveniently and economically furnish ice in a flaked or particulate form, without exposing such ice to any source of contamination. It will be further noted that the ice producing mechanism per se does not constitute a material part of the present invention and therefore will not be described in detail. By way of example, this mechanism may be of the type shown and described in Trow et al., Patent No. 2,753,694, issued July 10, 1956, which is incorporated herein by reference as a part of the descriptive portion of this application.

Referring now to FIGURES 4 and 5, the ice vending assembly 28 comprises an elongated cylindrical outer bin 30 which is supported on a suitable structure or platform in the position illustrated in FIGURE 2 and around which is disposed a layer of suitable insulating material, generally designated 32. The lower end of the bin 30 is closed by a bottom portion 34, which is preferably fabricated of stainless steel, or equivalent corrosion-resistant material such as molded plastic, or the like, the portion 34 providing a fluid-tight seal in the lower end of the bin 30 and being supported therein by having a downwardly extending flange section 36 that is formed around the outer periphery of the portion 34, spotwelded or similarly secured within the inner periphery of the bin 30. A radially extending and generally oval-shaped opening 38 is formed in the bottom portion 34 within which is supported a downwardly projecting particulate ice outlet or discharge spout 40 that is formed with a peripheral groove or slotted section 42 which is adapted to receive the periphery of the opening 38. The bottom portion 34 is also formed with a slightly depressed or concave section 43, at the lowermost point of which is supported a downwardly extending drain fitting 44 which functions to communicate moisture accumulated within the lower end of the bin 30 to a suitable drain depository, or the like, as will later be described. As seen in FIGURE 4, a layer of the insulating material 32 is also provided on the lower side of the bottom portion 34.

Extending coaxially within the bin 30 is a particulate ice storage inner bin 46 that is slightly smaller in diameter than the outer bin 30 and is mounted for rotary movement therewithin. The lower end of the inner or ice storage bin 46 is formed with an outwardly flared section 47 which serves to uniformly space the bin 46 from the inner periphery of the outer bin 30 and supports the bin 46 on a peripheral shoulder section 48 of an annular bottom plate 50 disposed in the lower end of the bin 30. As seen in FIGURE 4, the plate 50 is tapered (preferably about 15°) radially outwardly and downwardly from the center to the periphery thereof, and is formed with a downwardly extending lower edge portion 52 that is contiguously engaged with the inner periphery of the outer bin 30 and bears upon the top of the periphery of the aforediscussed bottom portion 34.

Preferably, the diameter of the ice storage bin 46 increases slightly from top to bottom to minimize any packing or adhesion between the ice particles stored therewithin. Furthermore, care should be taken to avoid having any irregularities or discontinuities on the inner surface on the bin 46, such as rivet heads or residual flash from welding, brazing, or the like. The reason for this is that the particulate ice, although preferably dry and hard when deposited within the bin 46, may be occasionally placed within the bin 46 while having moist surfaces and/or water entrapped therewithin, such as during abnormal ambient temperature conditions or maladjustment of the ice producing mechanism 24. When such conditions exist, there is a tendency for the particles of ice to adhere to any surface discontinuities as well as to each other, thereby causing a condition generally known as "bridging." By thus keeping the inner surfaces of the storage chamber uniformly smooth, such potential bridging problems are substantially eliminated.

As best seen in FIGURE 4, the plate 50 is detachably secured within the lower end of the outer bin 30 by means of a bayonet-type locking arrangement provided by three circumferentially spaced and radially inwardly extending locking pins, generally designated 54, that are arranged around the inner periphery of the lower end of the bin 30 and are adapted to be disposed one within each of three inverted L-shaped slots 56 that are formed around the lower edge portion 52 of the plate 50. It will be apparent, of course, that when it is desired to remove the plate 50 from its operative position illustrated in FIGURE 4, for example, to facilitate cleaning or the like, it is merely necessary to rotate the plate 50 sufficiently to disengage the pins 54 from the slots 56, and thereafter lift the plate 50 out of the bin 30.

The inner or ice storage bin 46 is rigidly secured to an elongated central hub or shaft member 58 that extends coaxially therethrough, by a pair of radially extending and diametrically aligned vanes or partition members 60 and 62. The members 60 and 62 are respectively formed with transverse flange portions 64 and 66 on their radially outermost ends, and with transverse flange portions 68 and 70 on their radially innermost ends, these flange portions being rigidly secured as by spotwelding or the like to the inner periphery of the bin 46 and to the shaft member 58, respectively. The lower ends of the vanes 60 and 62 are inclined or tapered (preferably about 15°) radially outwardly and downwardly from the shaft member 58 to the periphery of the bin 46 and thereby conform with the conical shape of the plate 50.

Rigidly secured, as by brazing or the like, within the lower end of the shaft member 58 is a cylindrical shaft guide 72 having a central bore 74 and within which is disposed a diametrically extending coupling pin 76. The bore 74 is adapted to receive a bifurcated upper end portion 78 of a cylindrical coupling member 80, the end portion 78 being formed with a diametrically extending slot 82 which engages the coupling pin 76, whereby rotary motion may be transmitted between the shaft guide 72 and the coupling member 80. The coupling member 80 is formed with a central bore 84 in the lower end thereof which is adapted to receive an upwardly extending paraboloid shaped mandrel section 86 of a support hub 88 that is centrally mounted on the bottom portion 34 of the outer bin 30 by having a lower cylindrical end portion 90 thereof rigidly secured within a central opening 92 formed in the bottom portion 34. As best seen in FIGURE 4, the coupling member 80 has a running fit within a central opening 93 in the plate 50.

As seen in FIGURE 4, an upper shaft guide member, generally designated 96 and having a central bore 98, projects upwardly from and is rigidly secured, as by brazing or the like, to the upper end of the central shaft member 58. A diametrically extending coupling pin 100, which is similar in construction to the aforementioned pin 76, is rigidly secured within the upper end of the member 96 and is adapted to be nested within a diametrically extending slot 102 defined by a bifurcated lower end portion 104 of a cylindrical drive shaft 106 that is disposed within the upper end of the bore 98 and functions to impart rotary movement to the central shaft member 58, and hence the entire ice storage bin 46.

The drive shaft 106 is rotatably supported, as by a suitable sleeve bearing 108, in the center of a flat circular cover member 110 that bears upon and closes the upper end of the outer bin 30. A layer of a suitable insulating material 111 is mounted on the upper surface of the member 110, as illustrated in FIGURE 4. As best seen in FIGURE 8, the upper end of the drive shaft 106 is formed with an enlarged coupling section 112 that defines a central bore 114, within which an output shaft 116 of a drive motor 118 is rigidly secured by a suitable set screw 120. The drive motor 118 is of a conventional design and is mounted on the top of the cover member 110 within a generally rectangular configured motor cover 122, as best seen in FIGURE 4.

The cover member 110 is detachably secured to the upper end of the bin 30 by means of three circumferentially spaced locking bolts 126 that are hingedly connected at their lowermost ends to the outer periphery of the bin 30 by suitable brackets 128, as seen in FIGURE 3. The upper ends of the bolts 126 are adapted to be received one within each of a plurality of slots, generally designated 130, that are formed one on the outer end of each of three of radially outwardly extending locking arms, generally designated 132, that are secured to the top of the cover member 110 by a plurality of bolts 134 that also serve to rigidly secure the motor cover 116 to the cover member 110. When it is desired to lockingly secure the cover member 110 on the bin 30, it is merely necessary to pivot the bolts 126 into engagement with the slots 130, whereby suitable means such as the thumb screws 136 illustrated herein may be used to rigidly secure the bolts 126 to the arms 132.

It will be seen from the foregoing construction that when the cover member 110 is removed from the top of the bin 30, the drive shaft 106 will become disengaged from the shaft guide member 96 secured within the upper end of the central shaft member 58. Accordingly, the ice storage bin 46, by virtue of being supported within the bin 30 by having the diametrically extending coupling pin 76 nested within the upper end portion 78 of the coupling member 80, may be conveniently removed from the bin 30 by merely being lifted axially therefrom. Thus, since the plate 50 is detachably secured within the lower end of the bin 30, as above described, and whereas the ice storage bin 46 is easily removable from the bin 30, the interior of the bin 30 is readily accessible and may be easily cleaned to remove any melt water residue, dirt or the like that may have accumulated therewithin.

Referring now to FIGURES 5 and 6, the plate 50 is formed with a particulate ice discharge opening 138 that extends radially from a point adjacent the central shaft member 58 to a point adjacent the shoulder section 48, this opening being located directly above the ice discharge spout 40 that is supported in the bottom portion 34, whereby particulate ice stored within the inner bin 46 may flow under the influence of gravity directly through the spout 40 into the dispensing cavity 14. The dispensing of ice is accomplished by rotating the inner bin 46, upon appropriate actuation of the drive motor 114, whereby the mass of particulate ice within the bin 46 is rotated relative to the bottom plate 50. As best seen in FIGURE 6, the portion of the plate 50 defining the far side of the discharge opening 138 (relative to the direction which the particulate ice is rotating) is slightly raised, thereby defining an ice shearing edge, herein designated 140. As the mass of particulate ice rotates relative to the bottom plate 50 due to the aforementioned rotary movement of the bin 46, the lowermost particles of ice which do not drop through the discharge opening 138 under the influence of gravity are sheared from the moving mass and thereafter drop through the opening 138 and the discharge spout 40 into a suitable depository such as a drinking glass or the like, located within the dispensing cavity 14 of the cabinet 12.

A shutter member 144, comprising a central support section 146 and a pair of radially extending and diametrically aligned shutter blades 148 and 150, is rigidly secured to the coupling member 80 by having the support section 146 brazed or similarly secured to a medial portion of the member 80; thus the shutter member 144 rotates with the coupling member 80 and the ice storage bin 46 upon energization of the drive motor 114. The shutter blades 148 and 150 are inclined radially outwardly and downwardly (preferably about 15°) from the support section 146 and rotate interjacent the top of the discharge spout 40 and the lower side of the bottom plate 50. The blades 148 and 150 are sufficiently wide to cover the discharge opening 138 and the upper end of the discharge spout 40 and therefore serve to selectively shed meltage water and block the flow of particulate ice being communicated from the interior of the bin 46 to discharge spout 40.

Referring now to the control system of the dispensing apparatus 10 of the present invention, a selector switch 151 is mounted on the front of the housing 12 (see FIGURE 1) and is adapted to be selectively positioned to control the quantity of ice or ice and water which is dispensed from the apparatus 10. More particularly, the selector switch 151 is of the rotary four-position type and may be adjusted to any one of the following four positions: (1) Continuous Ice (2) Metered Ice (3) Maximum Ice and Water and (4) Minimum Ice and Water. The selector switch 151 is connected through a plurality of conductors later to be described with the electric circuit controlling energization of the drive motor 118, and also with a plurality of bin control switches 152, 154 and 156 which are adapted to selectively control deenergization of the drive motor 118, as will hereinafter be described.

Referring now to FIGURES 7 through 9, mounted coaxially of the drive shaft 106 directly below the coupling section 112 is a substantially cylindrical shaped cam member 158 which is secured to the shaft 106 by a suitable set screw 159. The member 158 is formed with a substantially flat or planar surface 160 and is peripherally engaged by a follower wheel 161 that is rotatably mounted on an actuating arm 162 of the bin control switch 152. The switch 152 is mounted within the motor cover 122 such that the follower wheel 161 is continuously engaged with the outer periphery of the cam member 158, the switch 152 being actuated each time the follower wheel 161 passes off from or onto the "flat" 160, as will be described. Secured to a medial portion of the cam member 158 and being rotatable therewith is a flat disc-shaped cam member 163 that is formed with a pair of diametrically opposed "flats," generally designated 164. The cam member 163 is adapted to be peripherally engaged by a follower wheel 165 that is rotatably mounted on the end of an actuating arm 166 of the bin control switch 154, the switch 154 operating in a manner similar to the switch 152 in being actuated each time the follower wheel 165 passes off from or onto one of the "flats" 164. The control switches 152 and 154 are connected through electric circuitry later to be described to the aforementioned selector switch 151, the drive motor 118 and to an actuating switch 167 which is mounted within the dispensing cavity of the cabinet 14 directly behind and engageable with an actuating arm 168 that is pivotably mounted at its upper end within the dispensing cavity 14. The selector switch 151 is also connected to a solenoid valve $S_1$ (see FIGURE 12) which controls the flow of cooling water through the fitting 25 in the dispensing cavity 14. During normal operation of the dispensing apparatus 10, when the actuating arm 168 is depressed or pivoted inwardly, for example, by biasing the arm 168 inwardly with a conventional drinking glass, cup, or the like, the switch 167 is actuated, thereby energizing the drive motor 118 causing rotation of the particulate ice storage bin 46, shutter member 144 and cam members 158 and 163. In a preferred construction, the drive motor 118 is geared to rotate these members at a speed of approximately six revolutions per minute.

When the selector switch 151 is adjusted to the Maximum Ice and Water position, the bin control switch 152 is adapted to control deenergization of the drive motor 118 after the bin 46, shutter member 144 and cam member 158 have rotated 360 degrees; that is, when the cam member 158 has rotated one complete revolution and the follower wheel 161 on the actuating arm 162 engages the flat 160, the switch 152 will be actuated, thereby shutting off the current to the drive motor 118, whereby the bin 46, shutter member 144 and cam member 158 will cease to rotate. By virtue of the fact that the selector switch 151 and actuating switch 167 are connected with the aforementioned solenoid valve $S_1$ controlling the flow of water through the fitting 25, during the time the actuating arm 168 is depressed, cooling water will continually flow through the fitting 25 into a suitable container disposed within the dispensing cavity 14. It will be noted that as the arm 168 is depressed, cooling water will be continually dispensed through the fitting 25, even though the ice vend cycle may have terminated due to deenergization of the drive motor 118 by the switch 152. By again depressing the arm 168, another vend cycle will be initiated, wherein the bin 46 will rotate one complete revolution concurrently with water being dispensed through the fitting 25, the ice vend cycle subsequently being terminated as the follower wheel 161 again engages the "flat" 160 on the cam member 158, and the water vend terminating when the arm 168 is released.

When the selector switch 151 is adjusted to the Minimum Ice and Water position, the bin control switch 154 is adapted to control deenergization of the drive motor 118 in essentially the same manner as the above described operation of the control switch 152, the only difference being that the switch 154 effects deenergization of the drive motor 118 after the bin 46, shutter member 144 and cam members 158 and 163 have rotated only 180 degrees. That is, when the follower wheel 165 on the actuating arm 166 passes onto the next successive "flat" 164 of the cam member 163, the control switch 154 is actuated, thereby shutting off the electric current to the drive motor 118. As in the case when the selector switch 151 is adjusted to the Maximum Ice and Water position, water will be discharged through the fitting 25 during the time the actuating arm 168 is depressed, even though the ice vend cycle is terminated. When the selector switch 151 is adjusted to the Metered Ice position, the bin control switch 154 is adapted to control the discharge of particulate ice in the identical manner above described, i.e., the ice vend cycle will terminate after the bin 46 rotates only 180°; however, when the selector switch 151 is thus positioned, the solenoid valve controlling the flow of cooling water from the fitting 25 will not be energized upon depressing the actuating arm 168 so that only particulate ice will be dispensed from the apparatus 10.

In the event that a continuous supply of ice is desired during the time the actuating arm 168 is depressed, the selector switch 151 may be adjusted to the Continuous Ice position, whereby ice will be continuously dispensed while the actuating arm 168 is depressed, the flow of ice ceasing only upon exhausting the quantity of particulate ice stored within the bin 46 or upon release of the arm 168. Since it is important that the bin 46 stop rotating at a position such that the shutter 144 registers or is aligned with the discharge spout 40, and also in a position such that one of the partition members 60 or 62 is centrally aligned with the particulate ice inlet chute 26 so that the ice being dispensed into the bin 46 will fall on each side of the partition members 60 and 62, there is provided the bin control switch 156.

As best seen in FIGURES 7 and 9, the control switch 156 comprises an actuating arm 169 which is adapted to peripherally engage the cam member 163 and thereby effect actuation of the switch 156 each time the arm 169 passes onto or off from one of the "flats" 164 of the member 163. When the selector switch 151 is adjusted to the Continuous Ice position, the control 156 is adapted to control deenergization of the drive motor 118 similar to the way the switch 154 effects deenergization of the motor 118, i.e., the switch 156 will be actuated each time the arm 169 engages the next successive "flat" 164 on the cam 163. The switch 156 is arranged such that the drive motor 118 will be deenergized at the exact time the shutter member 144 is aligned with the discharge spout 40, whereby the shutter 144 will prevent dirt and similar contaminants from entering the bin 46 and prevent ice meltage from passing into the discharge spout 40.

It will be noted that if the ice dispensing apparatus 10 of the present invention is to be incorporated in vending machines such as cold drink dispensing machines of the type well known in the art, energization of the drive motor 118 may be controlled directly from the actuating or impulse circuit of the particular vending machine, thereby obviating the necessity of the actuating arm 168 and the switch 167 described herein.

Incorporated in the control system of the dispensing apparatus 10 of the present invention is a means for automatically energizing the aforementioned particulate ice producing mechanism 24 to control the level or quantity of ice deposited within the ice storage bin 46. Such a means is provided through the use of a pair of actuating switches 170 and 171 which are connected in series with the actuating circuit of the mechanism 24, whereby either of these switches 170 or 171 will operate to deenergize the mechanism 24, but both switches must be "on" to effect energization of the mechanism 24.

As best seen in FIGURES 7 and 10, the actuating switch 170 is mounted on a raised or elevated portion 173 of the cover member 110 which registers or is aligned with the ice inlet spout 26 that communicates particulate ice from the ice producing mechanism 24 into the interior of the ice storage bin 46. An actuating plate 172, which is engageable with the mass of particulate ice stored within the bin 46, is pivotably mounted by a suitable pivot pin 174 on the inner or lower side of the cover member 110 and is spring loaded in a "down" position or toward the position illustrated by the phantom lines in FIGURE 10. When the bin 46 is full, the plate 172 is forced upwardly to the position illustrated by the solid lines in FIGURE 10, whereby the switch 170 is deactuated, thus breaking the circuit communicating electric current to the ice producing mechanism 24. At such time as the level of particulate ice within the bin 46 drops a predetermined amount, the plate 172 is resiliently biased out of engagement with the switch 170, thereby effecting actuation of the switch 168. It may be noted that such a control (the switch 170) is not in itself sufficient to efficiently control the energization and deenergization of the ice producing mechanism 24, the reason for this being that the ice producing mechanism 24 would "short cycle" or be prematurely energized when a substantial quantity of particulate ice remained in the ice storage bin 46. To obviate this situation, the switch 171 is connected in series with the switch 170 and must be closed together with the switch 170, in order to effect energization of the ice producing mechanism 24.

As seen in FIGURE 11, the switch 171 is also mounted on a raised or elevated portion 175 of the cover member 110 and is adapted to be actuated by appropriate movement of a hinged flipper member 176 which is pivotably supported subjacent the switch 171 on a generally C-shaped support member 178 that is secured to the cover member 110 by a pair of thumb screws 180. The flipper member 176 projects downwardly within the bin 46 to a position directly above the upper ends of the vanes 60 and 62. When the level of the particulate ice within the storage bin 46 is below a preselected level, the actuating plate 172 will be in its above described "down" position and the flipper member 176 will be oriented in the position illustrated in FIGURE 11 (substantially vertical), whereby current will flow through both of the switches 170 and 171 to effect energization of the ice producing mechanism 24. Assuming no vends occur during the process of filling the bin 46, the ice level within the bin 46 will rise along the opposite faces of the member 176 without disturbing its vertical positioning, and without opening the switch 171. However, when the bin 46 is substantially full, the actuating plate 172 is forced upwardly by the raising ice, thereby deactuating switch 170 and breaking the electric circuit to the ice producing mechanism 24. The opening of switch 170 interrupts the operation of the mechanism 24, even though under the conditions stated, the switch 171 remains closed. As soon as a vend is made, the entire storage bin 46 is rotated, as above described, and the motion of the ice past the member 176 causing it to swing upwardly and ride on the upper surface of the mass of particulate ice within the bin 46, thereby deactuating the switch 171. After a preselected quantity of particulate ice has been metered from the bin 46 (approximately two vends) the actuating plate 172 will be biased to its "down" position illustrated in FIGURE 10, but the ice producing mechanism 24 will not be energized since the flipper member 176 which is riding on the ice mass continues to deactuate the switch 171. Only at such time as the level of the particulate ice falls to a level wherein the flipper member 176 is biased to its down position will the switch 171 be actuated, thus effecting energization of the ice producing mechanism 24.

It may be noted that along with the actuating plate 172, the flipper member 176 is spring loaded, whereby the upper surface of the mass of particulate ice within the bin 46 will be automatically leveled as the flipper member 176 rides upon the top of the mass of rotating ice during operation of the ice dispensing assembly 28. Accordingly, the flipper member 176 will not tend to slide into or out of cavities in the upper surface of the mass of rotating ice to inadvertently effect energization of the ice producing mechanism 24.

Referring again to FIGURE 2, the drain outlet fitting 44 provided in the bottom portion 34 of the outer bin 30 is adapted to be connected to any suitable drain conduit for communicating any melt water away from the dispensing apparatus 10; however, where drainage facilities are not available, a suitable outlet conduit 182 may be used to communicate drain water from the fitting 44 to a sump tank 184 which may be mounted in the lower end of the cabinet 12 adjacent a motor operated pump assembly, generally designated 186. A suitable float device 188 may be provided in the sump 184 for actuating a pump energizing switch 190, whereby the pump assembly 186 will serve to force the water from the sump 184 through a suitable conduit 192 back to the freezing portion of the ice producing mechanism 24 when the level of the melt water reaches a preselected level within the sump 184. It will be apparent, of course, that the melt water may be transmitted to a suitable evaporation pan (not shown) located within the cabinet 12, instead of being recirculated, as above described.

Referring now to the schematic wiring diagram of the ice dispensing apparatus 10 of the present invention, as seen in FIGURE 7, electric current is supplied to the apparatus 10 by means of a conventional plug 200 which is adapted to be inserted into a suitable wall receptacle of the type commonly found in residential and commercial electrical systems. The plug 200 is connected through a conductor 202 to a main on-off switch 204 that is mounted within the housing 12, as seen in FIGURE 3, and is adapted to control the flow of electric current to the four electric motors that are incorporated in the apparatus 10, i.e., the drive motor 118, a compressor motor 206, a fan motor 208 and a freezer motor 210 which drives a suitable conveying apparatus for transferring particulate ice from the ice producing mechanism 24 to the ice vending assembly 28. The switch 204 is connected through a conductor 211 with the actuating switches 170 and 171 that selectively control energization of the motors 206, 208 and 210, as hereinbefore described. The switch 204 is also connected through conductors 212 and 214 to the dispenser actuating switch 167 and bin control switch 156, respectively, the switch 156 being controlled by the arm 169 and cam 163 and connected in parallel with the bin control switches 152 and 154 through conductors 216, 218 and 220. As illustrated in FIGURE 12, the switches 152, 154, 156 and 167 are of the double position type. The switches 152 and 154 are connected to the four-position rotary selector switch 151 which, as seen in FIGURE 12 is of a double gang type, by a pair of conductors 222 and 224, respectively, the selector switch 151 being connected to the water solenoid valve $S_1$ by a conductor 226. The four positions to which the selector switch 151 may be adjusted are indicated by the numerals I, II, III, IV, these letters respectively representing the Continuous Ice cycle, the Metered Ice cycle, the Maximum Ice and Water cycle, and the Minimum Ice and Water cycle. It will be seen that when the selector switch 151 is adjusted to either of the ice and water positions (III or IV), the electric circuit will be completed to the solenoid valve $S_1$ so that water will be dispensed simultaneously with a charge of particulate ice, as hereinbefore described. Conversely, when the switch 151 is adjusted to either the Continuous Ice or the Metered Ice cycle position (I or II), the circuit to the solenoid valve $S_1$ remains open so that only particulate ice will be dispensed from the apparatus 10.

A more detailed description of the schematic diagram illustrated in FIGURE 12 will now be given with particular reference being made to the cyclic operation of the apparatus 10 when the selector switch 151 is disposed in each of its four selection positions.

Assuming that the selector switch 151 is adjusted to the Continuous Ice Position (I) and that the main on-off switch 204 is closed, the switch 167 is initially actuated upon biasing a glass or the like into engagement with the actuating arm 168, whereby switch 167 will move from the $a$ contact position to the $b$ position in FIGURE 12. When the switch 167 has been thus actuated, electric current will be transmitted from the conductor 202 through the switch 167 to the conductor 224, through the selector switch 151 and conductors 228 and 216 to the drive motor 118, resulting in the drive motor 118 being energized to initiate an ice vending cycle. The motor 118 will remain energized until the actuating arm 168 is released, at which time the switch 167 will be spring biased from its $b$ contact position back to its $a$ position to open the circuit to the motor 118. In the event that the actuating arm 168 is released when the follower arm 169 of the positioning switch 156 is engaged with an arcuate portion of the cam member 163, the switch 156, together with the cam controlled switch 154, will function in the following manner to maintain the motor 118 energized for a predetermined amount of time until the vanes 60, 62 and shutter member 144 are properly oriented, as above described.

Assuming that the actuating arm 168 is released when the follower arm 169 is engaged with an arcuate portion of the cam 163, the motor 118 will remain energized since electric current will be communicated to the motor 118 through the conductor 214 and switch 156 which is normally spring biased to its *a* contact position but which at this time is held in its *b* position by the cam 163. As the arm 169 rides on to the next flat 164 of the cam member 163, the switch 156 will be spring biased to its *a* position, thereby opening the circuit to the motor 118 through the conductor 214; however, the motor 118 will still remain energized by virtue of the fact that the switch 154, which is normally spring biased to its *a* contact position, is biased to its *a* position by the follower wheel 165 riding on to the same flat 164 immediately prior to the arm 169 engaging this flat. Therefore, the circuit to the motor 118 is completed through the switch 167, conductor 218 and switch 154. This circuit will remain closed until the follower wheel 165 rides off of the flat 164, at which time the switch 154 will again be biased to its *b* position to open the circuit and deenergize the motor 118. At this time, the cam members 158, 163, along with the follower arms 162, 166 and 169 are oriented in their respective positions illustrated in FIGURE 9 or in a position 180° therefrom preparatory to the next operational cycle of the apparatus 10. It will be seen, therefore, that if the switch 167 is deactuated when the vanes 60, 62 and shutter member 144 are not properly oriented, the motor 118 will momentarily remain energized until the desired positioning of these members, along with aforesaid cams and cam followers, is achieved.

Assuming that the selector switch 151 is positioned in the Metered Ice Position (II), that arms 162, 166 and 169 are oriented as aforesaid, and that the main on-off switch 204 is closed, operation of the apparatus 10 is initiated upon depressing the arm 168 wherein the switch 167 is biased to the *b* contact position so that current is transmitted from the conductor 202 to a conductor 230 and the switch 154, which is in its *b* position, to the motor 118, thus effecting energization of the motor 118 and causing particulate ice to be dispensed from the apparatus. As above stated, when the switch 154 is in its *b* position, the follower wheel 165 is engaged with an arcuate portion of the cam member 163. After the bin 46 has rotated approximately 180°, the follower wheel 165 of the switch 154 will ride on to the next flat 164 of the cam member 163, whereby the switch 154 will be biased from the *b* contact position to the *a* position to open the circuit to the motor 118 through the conductor 230. However, the motor 118 will remain energized until arm 169 rides on to flat 164 of cam 163 through the switch 156 and conductor 214, at which time the motor 118 will stop. After the motor 118 has been deenergized, the actuating arm 168 will be released by removing the cup or glass from the dispensing cavity 14, thereby causing the switch 167 to be biased to its *a* position, at which time the motor 118 will be momentarily reenergized due to completion of the circuit through the switch 167, conductor 218 and switch 154. The motor 118 will remain reenergized until the follower wheel 165 rides off of the flat 164 of cam 163, at which time the cam members 158 and 163 and follower arms 162, 166 and 169 are disposed in their respective positions illustrated in FIGURE 9 or 180° therefrom preparatory to the next Metered Ice vend cycle.

In the event that the actuating arm 168 is released prematurely, i.e., prior to the end of a complete vend cycle, the switch 167 will be biased to its *a* contact position, thereby opening the circuit to the motor 118 through the conductor 230; however the motor 118 will remain energized by virtue of the fact that the switch 156 is disposed in its *b* contact position since the follower arm 169 of the switch 156 is engaged with an arcuate portion of the cam member 163, whereby to complete the circuit to the motor 118 through the conductor 214. As the arm 169 rides on to the next flat 164 of the cam member 163, the switch 156 will be biased to its *a* position, thereby breaking the circuit to the motor 118 through the conductor 214; however, as above described, the motor 118 will remain energized by virtue of the fact that the switch 154 is biased to its *a* contact position by the follower wheel 165 riding on the same flat 164 immediately prior to the arm 169 engaging this flat. Therefore, the circuit to the motor 118 is completed through the switch 167, conductor 218 and switch 154. This circuit will remain closed until the follower wheel 165 rides off of the flat 164, at which time the switch 154 will be biased to its *b* position to open the circuit and deenergize the motor 118, whereby the cam members 158, 163 and follower arms 162, 166 and 169 are oriented in the respective positions illustrated in FIGURE 9 or 180° therefrom in preparation for the next operational cycle.

When the selector switch 151 is adjusted to the Maximum Ice and Water Position (III) and assuming that the cams and cam followers are oriented as shown in FIGURE 9, operation of the apparatus 10 is also initiated upon actuation of the switch 167, wherein current is communicated from the conductor 202 to the switch 167 and conductor 224 to a conductor 232 and the conductor 222. From the conductor 222, current is communicated through the switch 152 which is normally spring biased to its *a* contact position, but is now held in its *b* position by cam 158. The current is then transmitted through a conductor 234 to the conductor 216 and finally to the motor 118 causing the apparatus 10 to commence its vend cycle. At such time as the bin 46 is rotated approximately 360°, the follower wheel 161 of the switch 152 will ride onto the flat 160 of the cam member 158, thereby causing the switch 152 to move to its *a* contact position to open the circuit to the motor 118 through the conductors 222 and 234. However, the motor 118 will remain energized until arm 169 rides onto flat 164 of cam 163 through switch 156 and conductor 214, at which time the motor 118 will stop. During the time the selector switch 151 is disposed in the Maximum Ice and Water Position, current will be communicated from the conductor 202 through the switch 167 and conductor 224 to the conductor 226, whereby to energize the solenoid switch $S_1$ so that cooling water is dispensed concurrently with the particulate ice, the switch $S_1$ being energized during the entire time the switch 167 is disposed in the *b* contact position, even though the ice dispensing cycle has terminated due to actuation of the switch 152. After the motor 118 has been deenergized due to actuation of the switches 152 and 154, the actuating arm 168 will be released thereby causing the switch 167 to be biased to its *a* position, at which time the motor 118 will be momentarily reenergized due to completion of the circiut to the motor 118 through the switch 167, conductors 218 and 220, switch 152, and conductors 234 and 216. The motor 118 will remain reenergized until the follower wheel 161 rides off of the flat 160, wherein the switch 152 is biased from its *a* position to its *b* position to open the above circuit, at which time the cam members 158, 163 and follower arms 162, 166 and 169 are disposed in the positions illustrated in FIGURE 9 or 180° therefrom.

In the event that the actuating arm 168 is released prematurely, i.e., prior to the bin 46 rotating a complete 360°, the switch 167 will be biased from its *b* position to its *a* position, as above described, thereby opening the circuit to the motor 118 through the conductors 224, 232, 222, etc. It will be noted, however, that the motor 118 will remain energized since current will be communicated to the motor 118 through the conductor 214 and switch 156 which is in its *b* contact position. As the follower arm 169 of the switch 156 rides on to the next successive flat 164 of the cam member 163, the switch 156 will be biased to its *a* position, thereby breaking the circuit to the motor 118 through the conductor 214; however, the motor 118 will still remain energized by virtue of the fact that the switches 152 and 154 are biased to their *a* contact positions by the follower wheels 161 and 165 riding on to the flats 164 and 160 immediately prior to the arm 169 engaging a flat. Accordingly, circuits to the motor 118 are completed through the switch 167, conductor 218 and switches 152 and 154. These circuits will remain closed until the follower wheels 161 and 165 ride off of the flats 160 and 164, at which time the switches 152 and 154 will be biased to their *b* positions to break the circuits and deenergize the motor 118. At this time, the cam members 168, 163, along with the follower arms 162, 166 and 169 are oriented in the respective positions illustrated in FIGURE 9 preparatory to the next operational cycle.

Finally, when the selector switch 151 is disposed in the Minimum Ice and Water Position (IV), operation of the apparatus 10 is initiated when the switch 167 is biased to its *b* contact position so that electric current is transmitted from the conductor 202 through the switch 167 and conductor 230 to the switch 154 which is in its *b* contact position.

After the bin 46 has rotated approximately 180°, the follower wheel 165 of the switch 154 will ride on to the next flat 164 of the cam member 163, whereby the switch 154 will be biased from the *b* contact position to the *a* position to open the circuit to the motor 118 through the conductor 230. However, the motor 118 will remain energized until arm 169 rides onto flat 164 of cam 163 through the switch 156 and conductor 214, at which time the motor 118 will stop. After the motor 118 has thus been deenergized, the actuating arm 168 will be released, thereby causing the switch 167 to be biased to its *a* position, at which time the motor 118 will be momentarily reenergized due to completion of the circuit through the switch 167, conductor 218 and switch 154. The motor 118 will remain reenergized until the follower wheel 165 rides off of the flat 164, at which time the cam members 158, 163 and follower arms 162, 166 and 169 are disposed in the positions illustrated in FIGURE 9. It will be seen that when the switch 167 is biased to its *b* contact position, electric current is transmitted from the switch 167 to a conductor 236 which is communicable with the conductor 226 to energize the solenoid valve $S_1$ so that water will be dispensed during the entire time the switch 167 is in its *b* position, even though the ice dispensing cycle has terminated due to actuating of the switch 154. As above described, in the event that the switch 167 is actuated prior to completion of the ice dispensing cycle, the switches 156 and 154 will function to maintain the motor 118 energized until such time as the bin 46 is properly oriented.

It may be noted that when the selector switch 151 is disposed in positions I, II or IV, the motor 118 may be deenergized when the cam members 158, 163 and follower arms 162, 166 and 169 are oriented 180° from their respective positions illustrated in FIGURE 9, in which case a shift to position III will produce an initial vend cycle of 180° instead of the normal 360°. Thereafter, however, during each successive vend cycle, the bin 46 will rotate 360° to dispense the desired amount of particulate ice.

It will be seen from the foregoing construction that the ice dispensing apparatus 10 of the present invention provides an extremely compact and simply designed unit which may be economically produced and conveniently installed. Moreover, the ice dispensing apparatus 10, constructed in accordance with the principles of the present invention, is adapted to dispense exact metered quantities or charges of particulate ice in an extremely sanitary manner and in particular, without any contact with human hands, thereby substantially enhancing the economy of operation, and minimizing any source of contamination.

While it will be apparent that the preferred embodiment herein illustrated is well calculated to fulfill the objects stated, it will be appreciated that the present invention is susceptible to modification, variation and change without departing from the proper scope or fair meaning of the subjoined claims.

I claim:

1. In an apparatus for storing and dispensing particulate ice:
a cylindrical particulate ice storage compartment,
a bottom plate closing the lower end of said compartment,
said plate having an opening therein extending from the center to the periphery of said compartment,
the portions of said plate defining the opposite radial edges of said opening being vertically offset relative to each other whereby to present a raised, shearing surface to a mass of ice particles moving across said opening,
vane means rotatable within said compartment for moving particulate ice across said opening,
drive means for effecting rotation of said vane means,
a drive shaft communicating said drive means with said vane means and rotatable therewith,
an actuating switch for selectively deenergizing said drive means, and
actuating means cooperable with said actuating switch and responsive to the rotative position of said drive shaft to actuate said switch and thereby whereby to deenergize said drive means.

2. In an ice dispensing apparatus:
a particulate ice producing mechanism,
a cylindrical particulate ice storage portion,
a bottom closure for said storage portion defining a discharge opening,
means for rotating said storage portion relative to said bottom closure whereby particulate ice stored within said portion is moved toward said opening,
cover means closing the upper end of said storage portion, and
nonrotatable means resiliently mounted on said cover portion for leveling the upper surface of the mass of particulate ice stored within said portion upon rotation thereof relative to said mean,
said means for leveling said particulate ice comprising first and second switch means engageable with the ice in said storage portion and circuit means connected to said ice producing mechanism, whereby said mechanism will not be energized when the upper surface of the ice in said ice storage portion is in contact with both of said first and second switch means or either one thereof, but said mechanism will be energized when the upper surface of the ice in said storage portion is out of contact with both of said first and second switch means.

3. In an ice dispensing apparatus:
means for supplying a source of particulate ice,
a particulate ice storage cylinder,
a bottom closure of said storage cylinder defining a particulate ice discharge opening,
radially extending vanes rotatably mounted in said cylinder for moving particulate ice toward and over said opening,
drive means for effecting rotation of said vanes,
shaft means interconnecting said drive means with said vanes and rotatable therewith, actuating means rotatable with said shaft means,
means responsive to the rotative position of said actuating means for selectively deenergizing said drive motor,
said last mentioned means including rotatable cam means and switch means actuatable in response to preselected rotational movement of said cam means, said cam means comprising a first eccentric adapted to actuate said switch means in response to a first amount of rotational movement of said cylinder and a second eccentric adapted to actuate said switch means in response to a second amount of rotational movement of said cylinder, and
switch means located adjacent particulate ice disposed within said cylinder and responsive to the quantity of ice within said cylinder to selectively energize said ice supplying means.

4. In an ice dispensing apparatus:
a particulate ice producing assembly, a cylindrical particulate ice storage portion,
a bottom closure for said storage portion having a particulate ice discharge opening formed therein,
a pair of radially extending partitions rotatably mounted in said storage portion for moving particulate ice toward said opening,
a drive motor for effecting rotation of said partitions,
shaft means interconnecting said drive motor with said partitions and rotatable therewith,
cam means mounted on said shaft means,
switch means including means responsive to the rotative position of said shaft for selectively deenergizing said drive motor,
first and second switch means each having a portion thereof engageable with the mass of particulate ice within said storage portion and responsive to the volume of said mass of ice to selectively energize said ice producing assembly, and
shutter means disposed below said bottom closure and rotatable with said shaft means, said shutter means selectively closing said discharge opening upon deenergization of said drive motor.

5. In combination in an ice machine:
a particulate ice producing mechanism,
a cylindrical stationary outer bin,
a cylindrical inner bin coaxially mounted within said outer bin and rotatable relative thereto,
said inner bin having a lower open end and defining a particulate ice storage compartment therewithin,
a conical plate detachably secured in the lower end of said outer bin and serving to close said lower open end of said inner bin,
said plate defining a particulate ice discharge opening extending radially from a point adjacent the center of said plate to a point adjacent the periphery thereof,
the portions of said plate which define the radial edges of said opening being vertically offset relative to each other and thereby defining a particulate ice shearing surface,
a drive shaft extending coaxially of said inner bin and being journaled adjacent said stationary plate,
a pair of radially extending vanes interconnecting said shaft with said inner bin whereby said inner bin and said vanes are rotatable with said shaft and serve to move particulate ice stored within said inner bin toward said discharge opening,
a cover member detachably closing the upper end of said inner and outer bins,
a drive motor secured to said cover member and effecting rotation of said drive shaft,
a shutter member disposed below said plate and rotatable with said drive shaft to selectively close said discharge opening,
an eccentric cam rotatable with said drive shaft,
switching means comprising cam follower means for selectively deenergizing said drive motor,
a pair of particulate ice level responsive switches mounted adjacent said inner bin and each comprising actuating members resiliently biased toward and engageable with a mass of ice stored within said inner bin,
said switches being connected in series with said ice producing mechanism and being arranged such that said ice producing mechanism is energized when one of said actuating members is engaged with said mass of ice and wherein said ice producing mechanism is deenergized when each of said members is engaged with said mass of ice.

6. In an apparatus for storing and dispensing a particulate material:
means defining a storage compartment for the material,
said means having a bottom portion closing the lower end thereof and defining a particulate material discharge opening,
material conveying means within said chamber for moving the material across said opening whereby to discharge the material through said opening,
shutter means adjacent said bottom portion and movable to and from a position closing said opening,
drive means for selectively moving said conveying means and said shutter means,
means for dispensing a fluid material adjacent said opening, and
means for controlling the dispensing of fluid material from said last mentioned means and actuation of said drive means.

7. In combination in a dispensing cabinet:
a dispensing cavity,
an open ended cylinder mounted within said cabinet and defining a particulate material compartment,
a stationary plate closing the lower end of said compartment,
said plate defining a particulate material discharge opening communicable with said dispensing cavity,
means for moving particulate material toward said opening,
shutter means for selectively closing said opening,
drive means for selectively moving said last mentioned means and said shutter means,
liquid dispensing means mounted in said dispensing cavity, and
means for controlling the dispensing of liquid from said last mentioned means nad actuation of said drive means in response to movement of said shutter means.

8. The invention as set forth in claim 7 which includes cam means for selectively aligning said shutter means with said opening upon deenergization of said drive means.

9. In an apparatus for storing and dispensing particulate ice:
a cylindrical particulate ice storage compartment,
a bottom closure for said compartment defining a discharge opening,
means including at least one radially extending vane member for moving particulate ice relative to said opening,
drive means for selectively rotating said last mentioned means,
shutter means disposed adjacent said bottom closure and rotatable with said vane member for selectively closing said opening, and
means responsive to rotative movement of said shaft for deenergizing said drive means when said shutter means is aligned with said opening.

10. In combination in a dispensing cabinet:
a source of particulate material,
a particulate material storage compartment,
passage means communicating material from said source to said compartment,
a bottom plate closing the lower end of said compartment,
said plate having an opening therein,
vane means rotatable within said compartment for moving the particulate material across said opening,
drive means for effecting rotation of said vane means, and
means including switching means and means responsive to rotative movement of said vane means for deenergizing said drive means when said vane means is substantially aligned with said passage means.

11. In an apparatus for storing and dispensing a particulate material:
a particulate material storage compartment,
a bottom plate closing the lower end of said compartment,
said plate having an opening therein, a discharge spout in the cabinet through which the particulate material is dispensed,
vane means rotatable within said compartment for moving the particulate material across said opening,
drive means for effecting rotation of said vane means,
shutter means rotatable with said vane means to and from a position blocking communication between said opening and said spout, and
means responsive to movement of said drive means for deenergizing said drive means at such time as said shutter means is aligned with said spout and said opening.

12. In apparatus for storing and dispensing a particulate material:
a rotatable open ended cylinder,
a portion closing one end of said cylinder and defining a particulate material discharge opening,
vane means rotatable within said cylinder for moving the particulate material toward and over said opening,
drive means for effecting rotation of said vane means, and
control means for selectively deenergizing said drive motor including rotatable cam means and switch means actuatable in response to preselected rotational movement of said cam means, said cam means comprising a first eccentric adapted to actuate said switch means in response to a first amount of rotational movement of said cylinder and a second eccentric adapted to actuate said switch means in response to a second amount of rotational movement of said cylinder.

13. In combination in a dispensing cabinet having a dispensing cavity:
an open ended cylinder mounted within the cabinet and defining a particulate ice storage compartment,
a stationary plate closing the lower end of said compartment,
said plate defining a particulate ice discharge opening communicable with the dispensing cavity,
vane means for rotating particulate ice stored within said compartment across said opening,
drive means for effecting rotational movement of said vane means,
liquid dispensing means disposed within said dispensing cavity,
valve means for selectively communicating a liquid through said liquid dispensing means,
switch means disposed within said dispensing cavity for selectively energizing said drive means and for opening and closing said valve means, and
means including switch means and actuating means responsive to movement of said vane means for actuating said switch means and thereby deenergizing said drive means.

14. The invention as set forth in claim 13 which includes circuit means wherein said valve means will continuously communicate liquid through said liquid dispensing means even though said actuating means actuates said switch means to denergize said drive means.

15. In an ice dispensing apparatus:
a housing defining a dispensing cavity,
a cylindrical particulate ice storage compartment within said housing,
a bottom closure for said compartment having a particulate ice discharge opening formed therein,
a pair of radially extending partitions rotatably mounted within said storage compartment for moving particulate ice toward said opening,
a drive motor for effecting rotation of said partitions,
shaft means interconnecting said drive motor with said partitions and rotatable therewith,
first and second switch means actuatable upon preselected rotative movement of said shaft means,
an actuating switch within said dispensing cavity and adapted to energize said drive motor,
said first switch means being adapted to deenergize said motor after said partitions rotate approximately one revolution,
said second switch means being adapted to deenergize said drive means after said partitions rotate approximately one-half a revolution,
a liquid dispensing outlet within said dispensing cavity,
valve means for selectively communicating liquid through said outlet and energizable by said actuating switch,
said valve means being adapted to communicate liquid through said liquid dispensing means simultaneously with actuation of said actuating switch, independent of deenergization of said drive motor, and
third switch means engageable with one of said cam members for effecting deenergization of said drive motor when said partition means are disposed at a preselected position with respect to said discharge opening.

16. In combination in a dispensing cabinet:
means including a rotatable open ended cylinder for dispensing particulate ice,
means for dispensing cooling water,
selector means for controlling individual actuation of said ice dispensing means and simultaneous actuation of said ice and water dispensing means, and control means including rotatable cam means and switch means actuatable in response to preselected rotational movement of said cam means, said cam means comprising a first eccentric adapted to actuate said switch means in response to a first amount of rotational movement of said cylinder and a second eccentric adapted to actuate said switch means in response to a second amount of rotational movement of said cylinder.

17. In combination in a dispensing cabinet:
a dispensing cavity,
an open ended cylinder rotatably mounted within said cabinet and defining a particulate ice storage compartment,
a stationary closure plate closing the lower end of said compartment,
said plate defining a particulate ice discharge opening communicable with said dispensing cavity,
rotatable vane means disposed within said cylinder and adapted to move particulate ice toward and over said discharge opening for dispensing particulate ice into said cavity,
liquid dispensing means mounted within said dispensing cavity, and
selector means adapted to selectively control individual or combined energization of said liquid dispensing means and said drive means.

18. The invention as set forth in claim 17 wherein said selector means includes means for continuously and discontinuously energizing said ice dispensing means.

19. In combination in a dispensing cabinet:
a dispensing cavity,
an open ended cylinder mounted within said cabinet and defining a particulate material compartment,
a stationary plate closing the lower end of said compartment,
said plate defining a particulate ice discharge opening communicable with said dispensing cavity,
shutter means for selectively closing said opening,
liquid dispensing means mounted in said dispensing cavity,
means for effecting rotation of said shutter means,
means for dispensing particulate material through said opening, and
switching means including a multiple position selector switch adapted to be selectively adjusted to a position only energizing said particulate material dispensing means and to a position simultaneously energizing said liquid dispensing means and said material dispensing means.

20. The invention as set forth in claim 19 wherein said multiple position selector switch is adapted to be adjusted to a position controlling continuous or discontinuous energization of said particulate material dispensing means.

21. The invention as set forth in claim 19 wherein said switching means includes means for deenergizing said particulate material dispensing means when said cylinder has rotated approximately 180°.

22. The invention as set forth in claim 19 wherein said switching means includes means for deenergizing said particulate material dispensing means when said cylinder has rotated approximately 360°.

23. In an apparatus for storing and dispensing a particulate material, means defining a cylindrical storage compartment for the material, said means having a portion closing one end thereof and defining a particulate material discharge opening, rotatably mounted, generally radially vane means within said chamber for moving particulate material toward and over said opening, whereby to discharge the material through said opening, and shutter means adjacent said portion and rotatable with said vane means for selectively closing said opening.

24. In an apparatus for storing and dispensing particulate ice, an open ended upright cylinder, a fixed bottom portion closing the lower end of said cylinder and defining therewith an ice particle storage chamber, said bottom portion defining a particulate ice discharge opening, vane means for rotating said cylinder relative to said bottom portion and for moving ice particles stored within said chamber toward and over said opening, drive means for effecting rotation of said cylinder, and means responsive to the rotative position of said drive means for selectively controlling the rotation of said cylinder.

25. In combination in a particulate material dispensing apparatus, means defining a particulate material storage compartment, said means having a particulate material discharge opening therein, a rotatable cylinder and vane means extending generally radially of said cylinder for moving particulate material stored within said compartment toward and over said opening, means providing a source of particulate material, means for communicating particulate material to said compartment, and means responsive to the quantity of material within said compartment for effecting energization of said material producing means.

26. In combination in a dispensing cabinet, a dispensing cavity, an open ended cylinder rotatably mounted within said cabinet and defining a particulate ice storage compartment, a stationary plate closing the lower end of said compartment, said plate defining a particulate ice discharge opening communicable with said dispensing cavity, drive means for selectively rotating said cylinder, shutter means rotatable with said cylinder for selectively closing said opening, liquid dispensing means mounted on said dispensing cavity, valve means for communicating liquid to said liquid dispensing means, and switch means for selectively actuating said valve means and deenergizing said drive means.

27. In an ice dispensing apparatus, an open ended rotatable cylinder defining a storage compartment, means closing the lower end of said cylinder and defining a particulate ice discharge opening, means including a drive shaft and vane means extending between said cylinder and said shaft for moving particulate ice toward and over said opening, a particulate ice producing mechanism communicable with said cylinder, and switch means engageable with the ice stored within said cylinder for controlling the flow of ice from said ice producing mechanism to said cylinder.

28. In an apparatus for storing and dispensing particulate ice, an open ended cylinder mounted for rotation about a vertical axis, a bottom portion closing the lower end of said cylinder and defining a particulate ice discharge opening, a pair of diametrically extending vanes rotatably mounted within said cylinder for moving particulate ice toward and over said opening, a drive motor, a drive shaft communicating said motor with said vanes, a shutter member disposed adjacent said bottom portion and rotatable with said drive shaft to selectively close said discharge opening, and control means for selectively deenergizing said drive motor including switch means and cooperable means for actuating said switch means in response to the rotative position of said drive shaft, whereby said shutter member will be substantially aligned with said discharge opening upon deenergization of said drive motor.

29. In an apparatus for storing and dispensing a particulate material, means defining a particulate material storage compartment, means in said compartment defining a particulate material discharge opening, vane means movably mounted within said compartment for moving particulate material toward said opening, drive means for moving said vane means, a drive shaft communicating said drive means with said vane means, and control means for selectively deenergizing said drive means comprising first and second means responsive to rotative movement of said shaft, said first means adapted to deenergize said drive means after said shaft rotates a predetermined angular amount, said second means adapted to deenergize said drive means after said shaft rotates a second predetermined angular amount.

30. In an apparatus for storing and dispensing particulate ice, means defining a cylindrical particulate ice storage compartment, a mounted bottom portion closing the lower end of said compartment and defining a particulate ice discharge opening, means adjacent said opening for shearing particulate ice from a mass of ice particles stored within said compartment, rotatable vane means within said compartment for moving particulate ice toward and across said opening, shutter means rotatable with said last mentioned means for selectively closing said opening, drive means for effecting rotation of said shutter means and the said vane means, and control means for selectively deenergizing said drive means including switch means and cooperable switch actuating means responsive to movement of the said drive means for actuating said switch means.

31. In an apparatus for storing and dispensing particulate ice, means defining a cylindrical particulate ice storage compartment, a detachably mounted bottom closing the lower end of said compartment and defining a particulate ice discharge opening, means adjacent said opening for shearing particulate ice from a mass of ice particles stored within said compartment, rotatable means with said compartment for moving particulate ice across said opening, shutter means rotatable with said last mentioned means for selectively closing said opening, drive means for effecting rotation of said shutter means and the said last mentioned means, control means for selectively deenergizing said drive means including switch means and cooperable switch actuating means responsive to movement of the said last mentioned means for actuating said switch means, and switch means engagement with the ice stored within said cylinder for controlling the flow of ice from said ice producing mechanism to said cylinder.

32. In an apparatus for storing and dispensing particulate ice, a cylindrical particulate ice storage compartment, a bottom closure for said compartment having a discharge opening extending radially from the center of said closure to the outer periphery thereof, means including a rotatable cylinder and at least one radially extending vane member for moving particulate ice toward and over said opening, drive means for selectively rotating said cylinder and vane member, shutter means disposed below said bottom closure and rotatable with said vane member for closing said opening, and control means for deenergizing said drive means after a predetermined amount of rotational movement of said shutter means, whereby said shutter means is aligned with and closes said opening upon de-energization of said drive means.

References Cited

UNITED STATES PATENTS

| | | | |
|---|---|---|---|
| 2,277,879 | 3/1942 | Ness et al. | |
| 2,581,562 | 1/1952 | Smith. | |
| 2,888,962 | 6/1959 | Ammon | 222—168.5 X |
| 3,044,277 | 7/1962 | Barnum | 222—146 |
| 3,059,450 | 10/1962 | Mueller | 222—146 |
| 3,075,363 | 1/1963 | Conto | 222—239 X |
| 3,101,872 | 8/1963 | Dickinson | 222—146 |
| 3,141,573 | 7/1964 | Patch et al. | 222—129.1 |
| 3,180,110 | 4/1965 | Dunn | 222—146 |
| 3,192,734 | 7/1965 | Swanson | 222—64 |
| 3,211,338 | 10/1965 | Weil et al. | 222—146 |
| 3,245,555 | 4/1966 | Sheehan | 222—64 |

ROBERT B. REEVES, *Primary Examiner.*

H. S. LANE, *Assistant Examiner.*

U.S. DEPARTMENT OF COMMERCE

PATENT OFFICE

Washington, D.C. 20231

UNITED STATES PATENT OFFICE
CERTIFICATE OF CORRECTION

Patent No. 3,406,871　　　　　　　　　　　　　　October 22, 1968

Walter H. Hoenisch

It is certified that error appears in the above identified patent and that said Letters Patent are hereby corrected as shown below:

Column 3, line 42, after "suitable" insert -- support --. Column 14, line 34, "mean" should read -- means --; line 49, "of" should read -- for --. Column 16, line 31, "nad" should read -- and --. Column 17, line 13, after "In" insert -- an --; line 60, "denergize" should read -- deenergize --. Column 20, line 48, after "bottom" insert -- portion --; line 53, "with" should read -- within --.

Signed and sealed this 10th day of March 1970.

(SEAL)
Attest:

Edward M. Fletcher, Jr.　　　　　　　　　　　WILLIAM E. SCHUYLER, JR.
Attesting Officer　　　　　　　　　　　　　　　Commissioner of Patents